Dec. 8, 1925.
H. E. STURTEVANT
1,564,798
POWER TRANSMISSION CHAIN
Filed Feb. 23, 1924   3 Sheets-Sheet 1
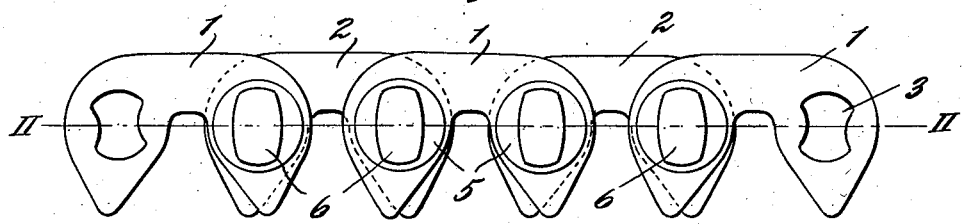
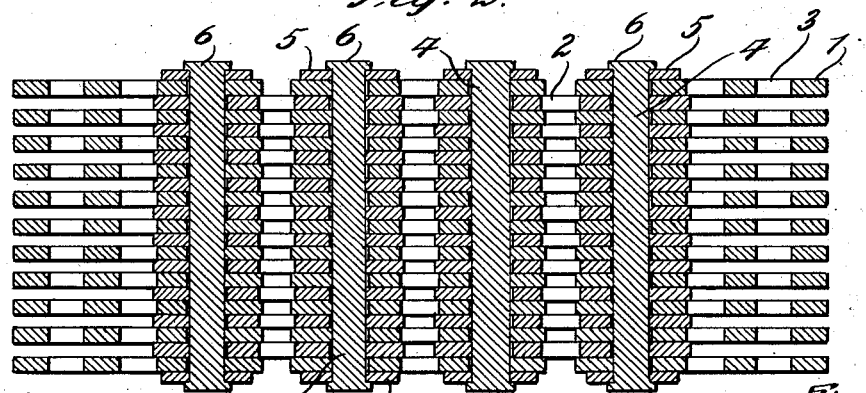
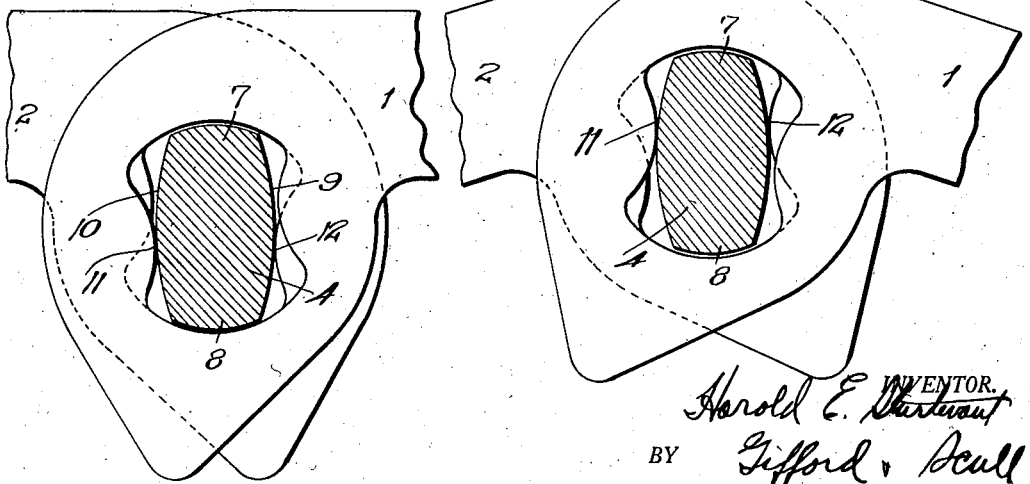
INVENTOR.
Harold E. Sturtevant
BY Gifford & Scull
his ATTORNEYS.

Dec. 8, 1925.

H. E. STURTEVANT 1,564,798

POWER TRANSMISSION CHAIN

Filed Feb. 23, 1924

3 Sheets-Sheet 2

INVENTOR.
Harold E. Sturtevant
BY Gifford & Bull
his ATTORNEYS

Dec. 8, 1925.　　　　　　　　　　　　　　　　　1,564,798
H. E. STURTEVANT
POWER TRANSMISSION CHAIN
Filed Feb. 23, 1924　　　　3 Sheets-Sheet 3

INVENTOR.
Harold E. Sturtevant
BY Gifford & Scull
his ATTORNEYS

Patented Dec. 8, 1925.

1,564,798

UNITED STATES PATENT OFFICE.

HAROLD E. STURTEVANT, OF HARTFORD, CONNECTICUT, ASSIGNOR TO THE WHITNEY MFG. CO., OF HARTFORD, CONNECTICUT, A CORPORATION OF CONNECTICUT.

POWER-TRANSMISSION CHAIN.

Application filed February 23, 1924. Serial No. 694,530.

*To all whom it may concern:*

Be it known that I, HAROLD E. STURTEVANT, a citizen of the United States, and resident of Hartford, in the county of Hartford and State of Connecticut, have invented certain new and useful Improvements in Power-Transmission Chains, of which the following is a specification.

My invention relates to link chains of the silent type, and consists of certain combinations which render the chain efficient, durable and noiseless in operation. Said combinations will be specifically described herein and pointed out in the appended claims.

Figure 5:
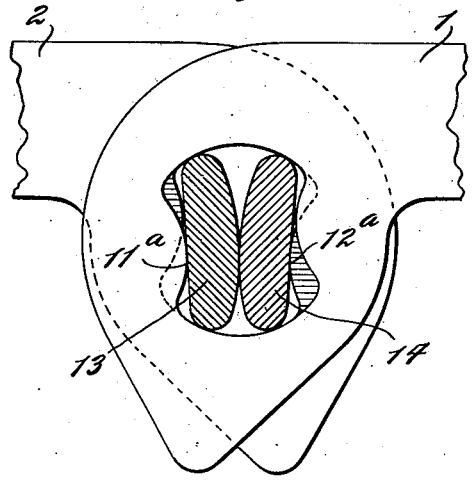
Figure 7:
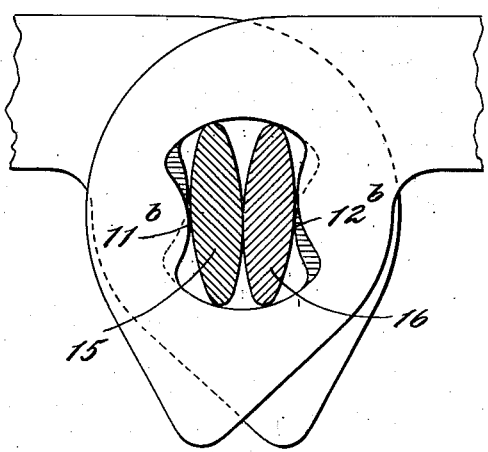
Figure 6:
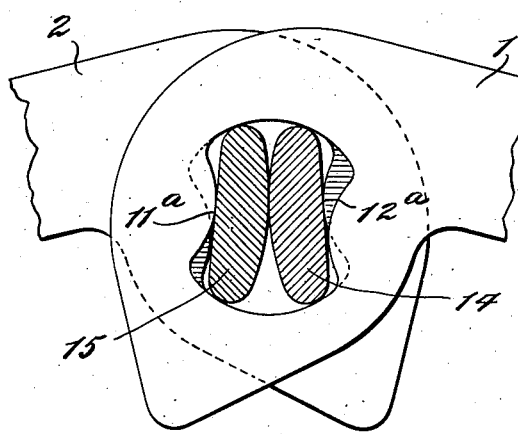
Figure 8:
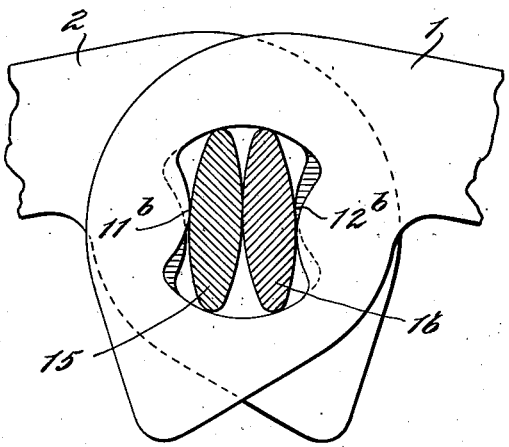
Figure 9:
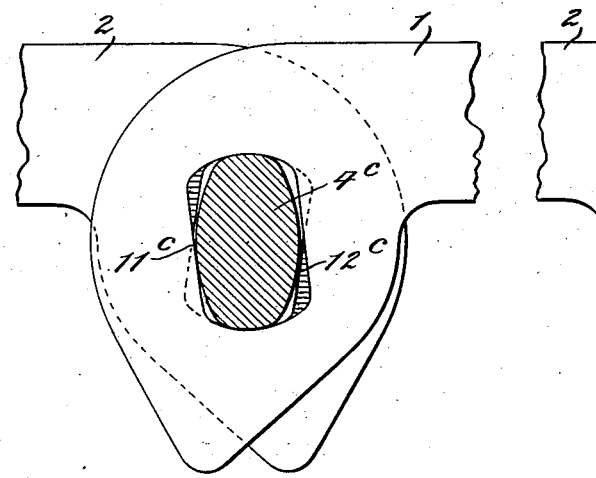
Figure 11:
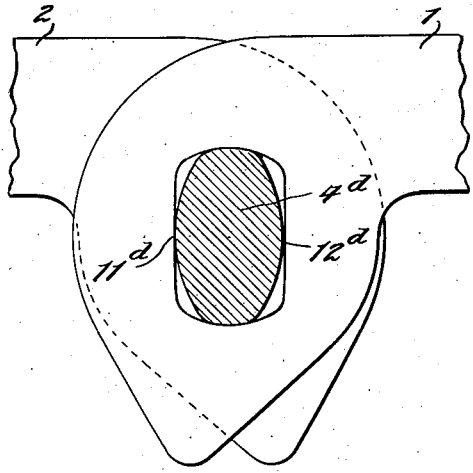
Figure 10:
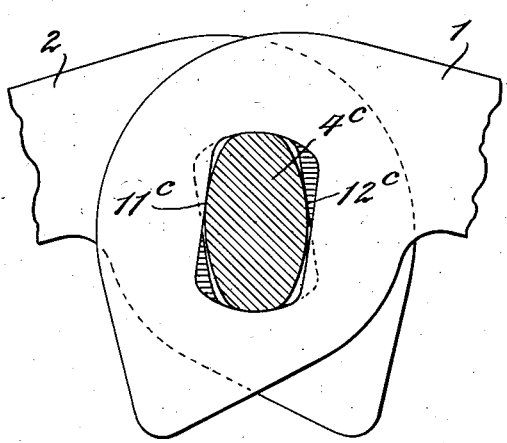
Figure 12:
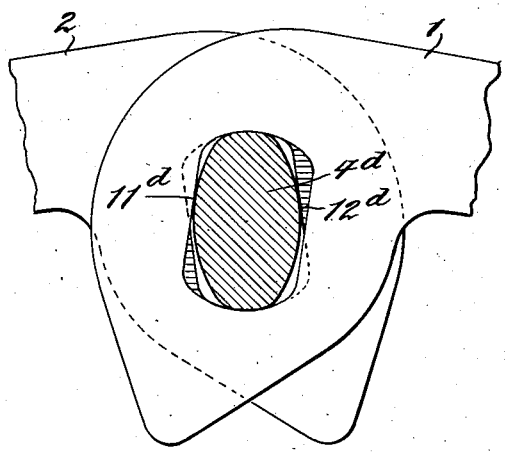

My invention will be better understood by reading the following description taken in connection with the drawings, showing certain embodiments thereof, and in which Fig. 1 is a side view of a portion of a chain containing one embodiment of my invention; Fig. 2 is an inverted sectional view taken on the plane of the line II—II of Fig. 1; Fig. 3 is a sectional elevation on a larger scale than the preceding figures, illustrating the positions assumed by the links of adjacent pitches and the pin passing through the openings therein in a straight run of the chain; Fig. 4 is a view similar to Fig. 3 illustrating the position of the parts when the joint is flexed; Fig. 5 is a view similar to Fig. 3, but of a modification of the invention; Fig. 6 is a view similar to Fig. 5 with the joint flexed; Fig. 7 is a view similar to Fig. 3 of a still further modification of my invention and Fig. 8 is a view similar to Fig. 7 with the joint flexed; Fig. 9 is a view similar to Fig. 3 of a further modification; Fig. 10 is a view similar to Fig. 9 with the joint flexed; Fig. 11 is a view similar to Fig. 3 of a further modification; and Fig. 12 is a view similar to Fig. 11 with the joint flexed.

Referring to the modification shown in Figs. 1–4, the chain consists of a plurality of links 1, and a plurality of a similar links 2. The ends of the links 1 and 2 overlap and are provided with registering openings 3. Pins 4 are placed through the openings 3, and after the desired number of links are placed together to form the chain, washers 5 are placed on the ends of the pins 4 and the ends of the pins are riveted over, as at 6, to hold the parts in place.

Referring to Figs. 3 and 4, it will be noted that the pin 4 is thinner at its edges 7 and 8 than at the middle, the sides 9 and 10 being curved. The walls of the openings in the ends of the links are likewise curved and engage the sides of the pin. The wall 11 of the link 1, and a corresponding wall 12 of the link 2 engage the sides of the pin 4 below the center of the pin, in the position shown in Fig. 3, which illustrates a straight run position of the chain parts. When the chain passes around a sprocket, the links assume the position shown in Fig. 4. In this position the walls 11 and 12 are in engagement with the sides of the pin above the center, so that when the parts move from the positions shown in Fig. 3 to those of Fig. 4, there is a rolling contact between the sides of the pin and the walls 11 and 12, the points of contact moving from below the center of the pin to above the center thereof.

By curving the sides of the pins, as shown in Figs. 3 and 4, the pitch of the chain is not substantially changed by reason of the movement of the parts from the positions shown in Fig. 3 to the positions shown in Fig. 4. Furthermore, by this arrangement one set of surfaces is provided during the straight run of the chain, and another set for the flexing of the joints. Sufficient clearance is provided between the edges 7 and 8 of the pin and the end wall of the openings in the links to prevent binding.

In the modification shown in Figs. 5 and 6, the pin is divided and consists of two members 13 and 14. In this modification the outer sides of the members 13 and 14 are straight, but the inner sides of these two members are convex, so that the effective cross section of the two members is quite similar to the cross section of the member of the pin 4, shown in Figs. 3 and 4. That is to say, the actual metal in the two members 13 and 14 is less at the edges of these members than at the middle thereof, so that as the joint flexes and the parts move from the positions shown in Fig. 5 to those shown in Fig. 6, the two members 13 and 14 roll upon each other at a point directly between the contacting points of the walls 11ª and 12ª of the links 1 and 2, respectively. In addition to the rolling contact between the sides of the pins and the links, there is a rolling action between the two members themselves. This arrangement eliminates friction and also provides one extra surface of contact in the joint, which has a tendency to decrease the noise of the chain as it passes over the sprocket.

The modification shown in Figs. 7 and 8 is like that shown in Fig. 5, in that the pin comprises two members 15 and 16. In this modification, however, the outer sides of the members 15 and 16 are curved like the sides 9 and 10 of the pin 4 of Figs. 3 and 4, and the inner sides of these members 15 and 16 are curved like the inner sides of the members 13 and 14 of Figs. 5 and 6. This arrangement reduces the thickness of the edges of the pins as compared with the middle thereof, so that as the parts move from the positions shown in Fig. 7 to those of Fig. 8, there is a less change of pitch in the modification of Figs. 7 and 8 than of Figs. 5 and 6. The members 15 and 16 roll upon each other as the joint is flexed, thus reducing the friction of the joint and increasing the efficiency of the chain.

In Figs. 9 and 10 the pin is in the general form shown in Figs. 3 and 4, and consists of a single piece. In this case, however, the curvatures of the sides of the pin are greater than in Figs. 3 and 4, and instead of the side walls 11ᶜ and 12ᶜ of the openings being curved they are straight. In the flexing of the joint the parts move from the position shown in Fig. 9 to those shown in Fig. 10 by reason of the curvature of the sides of the pin, and the pitch of the chain is maintained during this flexing movement. In this modification the openings are arranged with the center line of the opening at an angle of about 8 degrees to the vertical through the pivotal joint, as plainly indicated in Fig. 9.

In the modification shown in Figs. 11 and 12 the pin 4ᵈ is the same in section as the pin 4ᶜ of Fig. 9. In this modification the walls 11ᵈ and 12ᵈ are straight and parallel. The positions of the parts in the straight run are shown in Fig. 11 and the positions of the parts of the joint flexed are shown in Fig. 12. The only difference between the modification shown in Figs. 9—10 and 11—12, is that in the former the openings are arranged at an angle to the vertical, whereas in Figs. 11 and 12 the openings are vertical. In the modification of Figs. 9—10 the walls of the links engage the pins below the center line during the straight run of the chain and above the center line during the flexing of the chain, whereas in Figs. 11 and 12 the walls of the links engage the pin on the center line in the straight run of the chain and above the center line when the chain is flexed.

In all of the forms illustrated, there is less rubbing action during the flexing of the joint than if the pins were of uniform thickness from edge to edge. This also eliminates friction and raises the efficiency of the chain.

In the forms illustrated in Figs. 1 to 8, inclusive, it will be noted that the curved walls 11 and 12 of the links are segmental, the centers of curvature of these walls being on lines below and at an angle to a line passing through the pivotal centers. It will also be noted that the openings in the ends of the links of all the modifications are alike and the links are, therefore, interchangeable. This materially simplifies the problem of assembly by automatic machinery in the factory and thus materially decreases the cost of production.

I have shown in the drawings a single-piece pin with the straight sided openings. I desire to be understood that the straight sided openings of the forms shown in Figs. 9 to 12 may be used with the two-piece pins, as illustrated in Figs. 5 to 8. The particular combination of features are to be selected in view of the particular use to which the chain is to be put. My primary purpose in illustrating the various forms is to show that these features may be combined in various ways to give efficient results.

I claim:

1. In a chain of the silent link type, a joint between adjacent pitches comprising a pin having an oblong cross section, with convex sides, the openings of the links being symmetrical and having walls engaging the sides of said pin and forming rolling contacts therewith.

2. In a chain of the silent link type, a joint between adjacent pitches comprising a symmetrical pin having an oblong cross section, thinner at the edges than at the middle, the openings in the links having sides engaging the sides of the pin and forming rolling contacts therewith.

3. In a chain of the silent link type, a joint between adjacent pitches comprising a symmetrical pin having an oblong cross section, thinner at the edges than at the middle, the openings in the links having sides engaging the sides of the pin and forming rolling contacts therewith, said contacts being below the pivotal center in the straight run of the chain and above the pivotal center when the joint is flexed.

4. In a chain of the silent link type, a joint between adjacent pitches comprising a symmetrical pin having an oblong cross section, with convex sides, the openings of the links having walls engaging the sides of said pin and forming rolling contacts therewith, said contacts being below the pivotal center in the straight run of the chain and above the center when the joint is flexed.

5. In a chain of the silent link type, a joint between adjacent pitches comprising two members having oblong cross sections, with convex sides, the openings of the links having walls engaging both sides of said pin and forming rolling contacts therewith.

6. In a chain of the silent link type, a joint between adjacent pitches comprising a pin of a plurality of parts having an oblong cross section, the composite pin being thinner at the edges than at the middle, the walls of the link openings engaging the outer sides of said pin to form rolling contacts therewith.

7. In a chain of the silent link type, a joint between adjacent pitches comprising a pin of a plurality of parts having an oblong cross section, the composite pin being thinner at the edges than at the middle, the walls of the link openings engaging the outer sides of said pin to form rolling contacts therewith, the inner sides of said pin parts also forming a rolling contact.

8. In a chain of the silent link type, a joint between adjacent pitches comprising a pin of a plurality of parts having an oblong cross section, the composite pin being thinner at the edges than at the middle, the walls of the link openings engaging the outer sides of said pin to form rolling contacts therewith, said contacts being below the pivotal center in the straight run of the chain and above the center when the joint is flexed.

9. In a chain of the silent link type, a joint between adjacent pitches comprising a pin of a plurality of parts having an oblong cross section, the composite pin being thinner at the edges than at the middle, the walls of the link openings engaging the outer sides of said pin to form rolling contacts therewith, the inner sides of said pin parts also forming a rolling contact, said contacts being below the pivotal center in the straight run of the chain and above the center when the joint is flexed.

10. In a chain of the silent link type, a joint between adjacent pitches comprising a pin having an oval cross section, with convex sides, the openings of the links having curved walls engaging the sides of said pin and forming rolling contacts therewith.

11. In a chain of the silent link type, a joint between adjacent pitches comprising a pin having an oval cross section, thinner at the edges than at the middle, the openings in the links having curved sides engaging the sides of the pin and forming rolling contacts therewith.

12. In a chain of the silent link type, a joint between adjacent pitches comprising a pin having an oval cross section, thinner at the edges than at the middle, the openings in the links having curved sides engaging the sides of the pin and forming rolling contacts therewith, said contacts being below the pivotal center in the straight run of the chain and above the pivotal center when the joint is flexed.

13. In a chain of the silent link type, a joint between adjacent pitches comprising a pin having an oblong cross section, with convex sides, the openings of the links being symmetrical and having curved walls engaging the sides of said pin and forming rolling contacts therewith, said contacts being below the pivotal center in the straight run of the chain and above the center when the joint is flexed.

14. In a chain of the silent link type, a joint between adjacent pitches comprising a pin of a plurality of parts having an oblong cross section, the composite pin being thinner at the edges than at the middle, the walls of the link openings being curved and engaging the outer sides of said pin to form rolling contacts therewith.

HAROLD E. STURTEVANT.